United States Patent
Barngrover et al.

(10) Patent No.: US 7,552,712 B1
(45) Date of Patent: Jun. 30, 2009

(54) PART-THROTTLE PERFORMANCE OPTIMIZATION

(75) Inventors: Michael Barngrover, Peoria, IL (US); Thomas M. Sopko, East Peoria, IL (US); Brian D. Kuras, Metamora, IL (US); Brian D. Hoff, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/956,081

(22) Filed: Dec. 13, 2007

(51) Int. Cl.
*B60T 7/12* (2006.01)

(52) U.S. Cl. ...................... 123/352; 701/110

(58) Field of Classification Search .............. 123/352, 123/350; 701/50, 93, 110; 180/65.2; 73/117.3
See application file for complete search history.

(56) References Cited

U.S. PATENT DOCUMENTS

| | | | |
|---|---|---|---|
| 4,515,041 A | 5/1985 | Frank et al. | |
| 4,580,465 A | 4/1986 | Omitsu | |
| 4,653,007 A | 3/1987 | Osanai et al. | |
| 4,958,611 A | 9/1990 | Uchinami et al. | |
| 5,046,177 A | 9/1991 | Vahabzadeh | |
| 5,368,530 A | 11/1994 | Sanematsu et al. | |
| 5,439,424 A * | 8/1995 | Sawada et al. | 477/46 |
| 5,890,470 A | 4/1999 | Woon et al. | |
| 6,385,970 B1 | 5/2002 | Kuras et al. | |
| 6,394,208 B1 * | 5/2002 | Hampo et al. | 180/65.2 |
| 6,405,587 B1 * | 6/2002 | Livshiz et al. | 73/114.25 |
| 6,436,005 B1 | 8/2002 | Bellinger | |
| 6,726,594 B2 | 4/2004 | Mizuno et al. | |
| 6,957,139 B2 | 10/2005 | Bellinger | |
| 7,160,224 B2 | 1/2007 | Hsieh et al. | |
| 7,192,374 B2 | 3/2007 | Kuras et al. | |
| 2005/0288148 A1 | 12/2005 | Kuras et al. | |
| 2006/0116806 A1 | 6/2006 | Steen et al. | |
| 2008/0086254 A1 * | 4/2008 | Anderson et al. | 701/93 |

* cited by examiner

*Primary Examiner*—Hieu T Vo
(74) *Attorney, Agent, or Firm*—Leydig, Voit & Mayer, Ltd

(57) ABSTRACT

A system and method for optimizing machine performance using speed shaping in a machine having an engine and a drivetrain implementing engine underspeed module receives a throttle command requesting an increase in engine speed and transmits the throttle command to the engine. If the requested increase exceeds a predetermined function, the predetermined function is forwarded to the engine underspeed module as a speed standard. The engine underspeed module determines whether the actual engine speed attained by the engine is less than the speed standard by more than a predetermined gap value and, if so, reduces the power required by the drivetrain to avoid lugging of the engine.

20 Claims, 8 Drawing Sheets

PART-THROTTLE PERFORMANCE OPTIMIZATION

TECHNICAL FIELD

This disclosure relates generally to systems and methods for controlling CVT transmissions and, more particularly, to anti-lugging systems and methods for machines having CVT transmissions.

BACKGROUND

Most engines comprise a number of rotating parts, and thus have an ideal speed range in which their power output is optimum. This ideal range may correspond, for example, to a range exhibiting peak torque output as a function of RPM. A broader permissible speed range encompasses this ideal range and includes greater and lesser speeds at which the engine may operate, even if in a suboptimum manner. Finally, outside of this permissible speed range lie speeds at which the engine cannot provide sustained operation. For example, speeds that are higher than the highest speed in the permissible range may cause greatly accelerated or catastrophic failure of the engine, transmission, or implement system.

At speeds lower than the bottom limit of the larger range, the engine may cease rotation. In particular, most engines operate via an inertia-driven cycle, wherein preceding combustion events power the engine toward subsequent combustion events via the engine's rotational inertia. When the engine speed decreases below a certain lower limit, the engine's rotational inertia is insufficient for the engine to reach subsequent combustion events. An example of a lowest reliable operating speed based on this principle is the engine "idle" speed. Typically, lower engine speeds are possible, but the idle speed is set to a value that allows for a slight decrease in engine speed without causing the engine to drop out of the sustained combustion range.

In a typical machine arrangement, the engine inertia must be sufficient to overcome not only the internal resistance leading up to a subsequent combustion event, but also any outside resistance imposed by the power train. For example, the inertial, frictional, or other resistance involved in moving the machine must be overcome when the machine is in gear. Thus, while the idle speed is a realistic lower limit when the machine is stationary, a machine in operation may have a heightened lower limit, below which the engine lacks sufficient power to accelerate or even continue a present operation. When the engine speed drops past this lower limit, the engine is said to "lug" down or "bog" down, and continued reliable operation is jeopardized.

In a conventional-drive machine, the engine is generally linked to the power train and other power sinks of the machine via a torque converter. In these systems, a higher resistance (required torque) is automatically mitigated by the natural loading characteristics of a torque converter, thus preventing the engine from lugging down and stalling. However, in a CVT-driven machine ("CVT" denotes a continuously variable transmission), there is generally no torque converter, and the machine resistance will be able to lug down and stall the machine absent an external control mechanism. Typically, the engine is monitored for lug/stall problems and the throttle or transmission is actively controlled, e.g., via a software Engine Underspeed Algorithm (EUA) in an Electronic Control Module (ECM) to avoid lug/stall.

A typical EUA reduces the drivetrain power demand, implement power demand, or other parasitic demand (e.g., power steering system, air conditioning system, etc.) in reaction to a difference between the actual engine speed and the desired engine speed (e.g., "speed standard"), detected from a user interface or from an engine control component as a response to changed conditions. However, during part-throttle operation, the desired engine speed command can change much more rapidly than the engine can react to that command. This may cause the EUA to over-correct and artificially reduce machine performance. In this case, the EUA appears to fulfill its mandate of preventing lugging, however lugging would not have occurred regardless, and the user was unnecessarily subjected to reduced system performance.

Although the resolution of deficiencies, noted or otherwise, of the prior art has been found by the inventors to be desirable, such resolution is not a critical or essential limitation of the disclosed principles. Moreover, this background section is presented as a convenience to the reader who may not be of skill in this art. However, it will be appreciated that this section is too brief to attempt to accurately and completely survey the prior art. The preceding background description is thus a simplified and anecdotal narrative and is not intended to replace printed references in the art. To the extent an inconsistency or omission between the demonstrated state of the printed art and the foregoing narrative exists, the foregoing narrative is not intended to cure such inconsistency or omission. Rather, applicants would defer to the demonstrated state of the printed art.

SUMMARY

In one aspect, the disclosure pertains to a method of optimizing machine performance using desired engine speed shaping. In this aspect, the method comprises receiving a throttle command requesting an increase in engine speed and transmitting the throttle command to the engine. Next, it is determined whether the requested increase exceeds a predetermined function and the predetermined function is forwarded to the engine underspeed module as a speed standard if the requested increase exceeds the predetermined function. Subsequently, the speed standard (derived from the predetermined function) is used in lieu of the actual desired speed for purposes of anti-lugging to avoid unnecessary decreases in system performance.

DETAILED DESCRIPTION

A typical EUA system operates by sensing that a difference between the requested and actual engine speeds exceeds a predetermined threshold. When a qualifying difference is detected, the EUA reduces the transmission, implement, and/or parasitic torque, speed or power requirements. An operator may desire a rapid increase in machine or engine speed and thus request a step change in desired engine speed. This may result in a significant deviation between demanded and actual power, causing the onboard EUA to diagnose engine lugging, automatically reducing system performance by reducing the system speed, torque or power.

Figure 1:
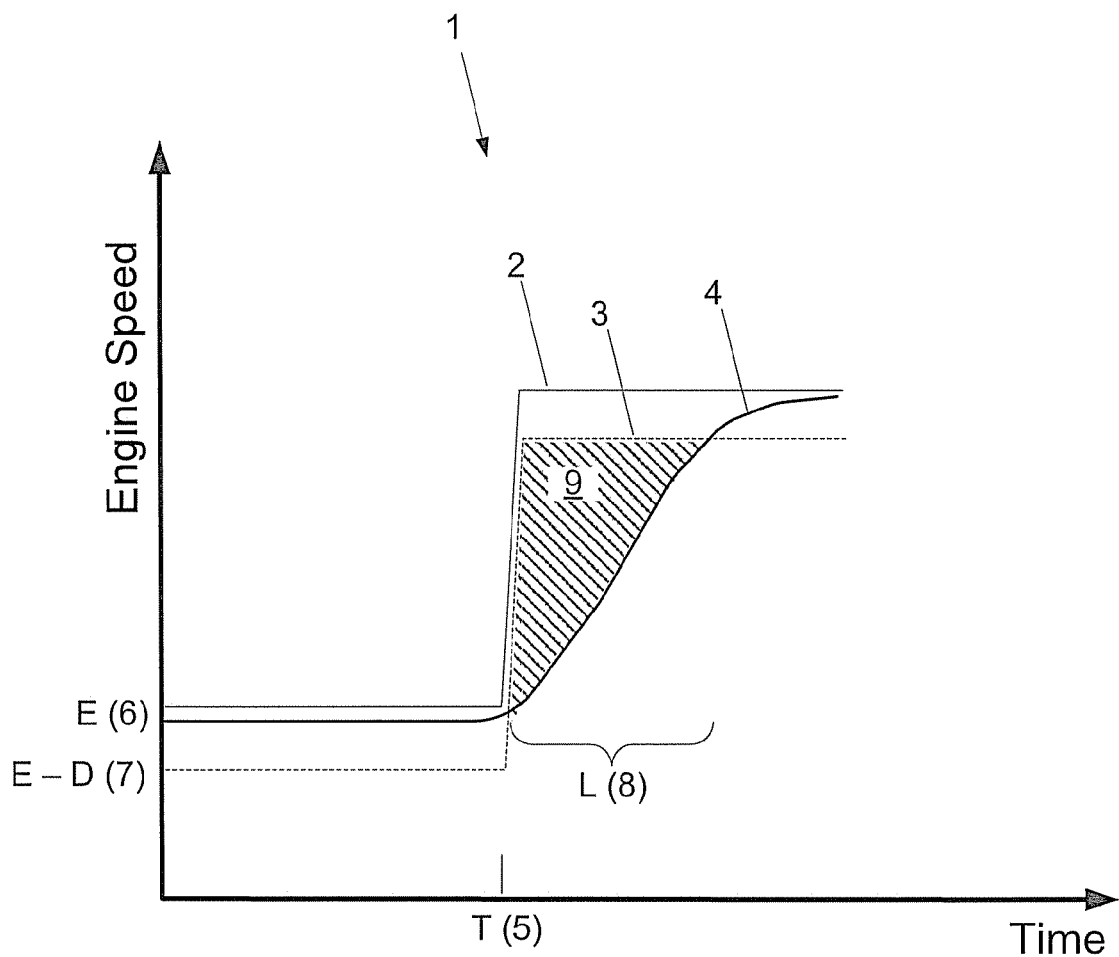
FIG. 1 is an engine speed graph showing a desired engine speed curve and an actual engine speed curve, wherein anti-lugging may decrease system performance.

This phenomenon is illustrated in the speed graph 1 of FIG. 1. In particular, the speed graph 1 illustrates a requested engine speed 2 including a step increase at time T (5), and the EUA lugging threshold 3 derived as a difference from the requested engine speed 2. In particular, the EUA lugging threshold 3 is less than the requested engine speed 2 by a gap value D. Thus, for example, the requested engine speed 2 starts at a value E (6) and the EUA lugging threshold 3 starts at a value E–D (7).

The speed graph 1 also shows the actual engine speed 4 (in the absence of anti-lugging correction). It can be seen that the actual engine speed 4 increases rapidly after the step increase in the requested engine speed 2 at T (5). However, due to engine inertia and other system characteristics, the actual engine speed 4 is not able to track the step function of the requested engine speed 2 as expected. Thus during a lag period L (8), corresponding to a plot region 9, the difference between the requested engine speed 2 and the actual engine speed 4 exceeds the gap value D.

Thus, during the lag period L (8), the EUA may incorrectly identify a lugging condition and apply anti-lugging correction by reducing the speed, torque, and/or power to the transmission, implements, or other parasitic devices, causing suboptimal performance and even stopping the machine or implement being driven in some cases. Although it is possible to eliminate the anti-lugging feature of the EUA, this would result in undesirable engine lugging under certain conditions. Instead, in an embodiment, machine performance is optimized during part-throttle operation via one or more of three compensation techniques, namely desired speed shaping, part-throttle power derating, and part-throttle torque derating.

The technique of desired speed shaping limits the rate at which the desired engine speed increases (and thus the engine speed threshold) to minimize the perception by the EUA of lugging. The part-throttle power derating technique limits the maximum system power request, while the part-throttle torque derating technique limits the maximum propulsion torque value.

With respect to desired speed shaping, in the case of a sharp increase, e.g., a step increase, in desired engine speed, the engine ECM or controller still receives the step speed command change in order to start producing power as fast as possible. However, the EUA is given a shaped desired engine speed calculated to delay the EUA lugging threshold 3 from a lower value to a higher value. In an embodiment, the shaped desired engine speed signal can be tuned to follow a desired engine speed trajectory that optimizes machine performance. With respect to the part-throttle power derating technique, the engine is unable to produce peak power at lower engine speeds. Therefore, in an embodiment, the peak drivetrain power is derated according to engine lug curve characteristics. This proactively prevents engine underspeed conditions from occurring.

Figure 2:
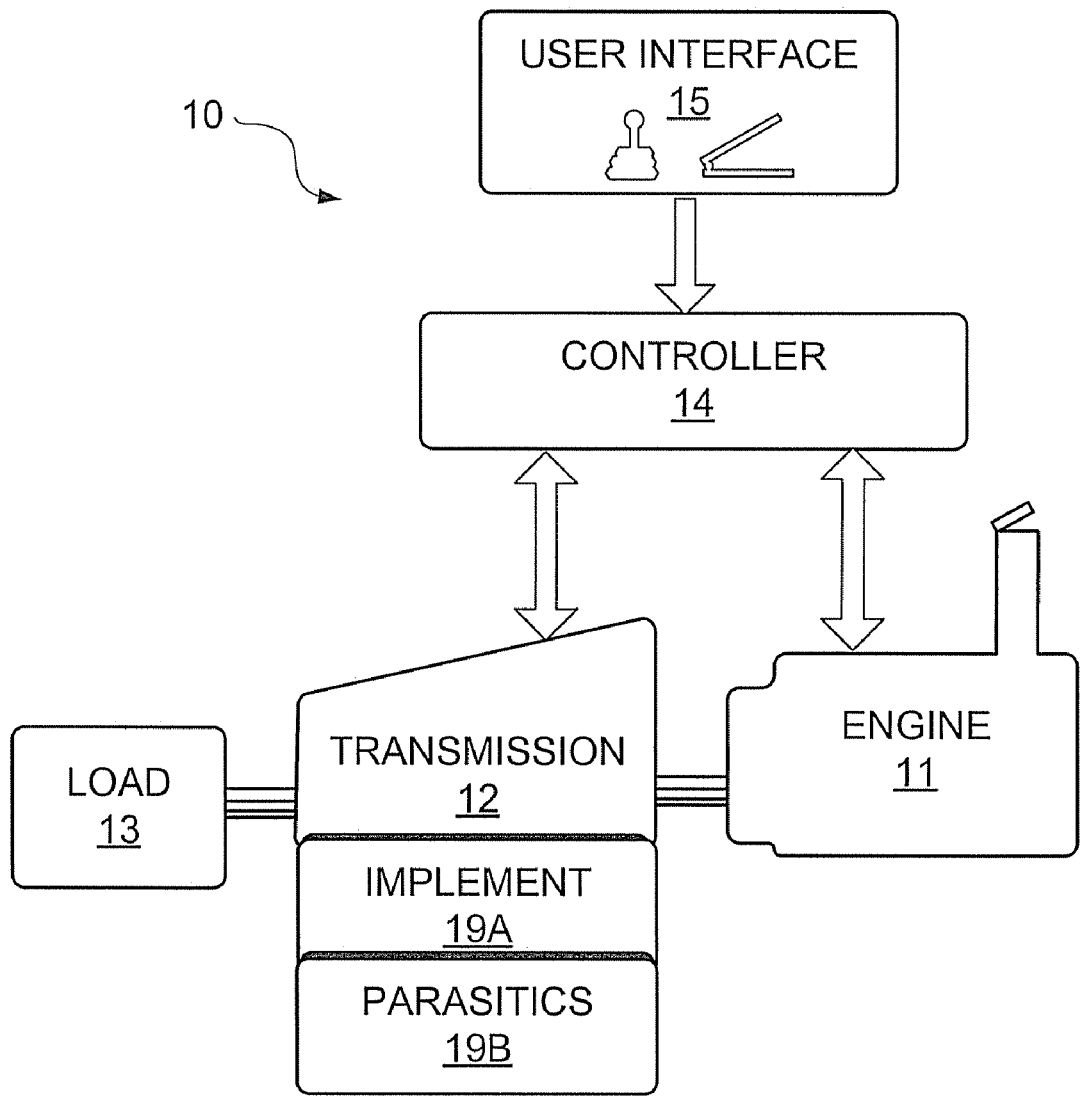
FIG. 2 is a system schematic diagram for a drivetrain system wherein part throttle optimization may be employed in accordance with the disclosed principles.

Referring again to the figures, the interactions of the drivetrain system inputs and elements are shown schematically in FIG. 2. The system 10 includes the engine 11, the transmission 12, and a load 13. The load may be the inertia or weight of the machine itself or some other load. The system 10 further includes a controller 14 and a user interface 15. The user interface may include typical user interface elements found in conventional machines such as joystick movement command devices and pedal or lever actuators for controlling throttle and/or speed and/or torque.

The controller 14 receives input from the user interface 15 with respect to, for example, desired engine speed. The controller 14 also receives inputs from the engine 11 and transmission 12 indicating the operating status of these elements, e.g., engine speed/torque and transmission speed/torque. The controller 14 can also receive inputs from other systems like implements and other parasitic loads. Based on these various inputs, the controller 14 controls the operation of the engine 11 and transmission 12, implements 19a and other parasitic devices 19b in a manner calculated to implement commands received from the user interface 15, consistent with system limitations, e.g., anti-lugging, anti-overspeed, etc.

Figure 3:
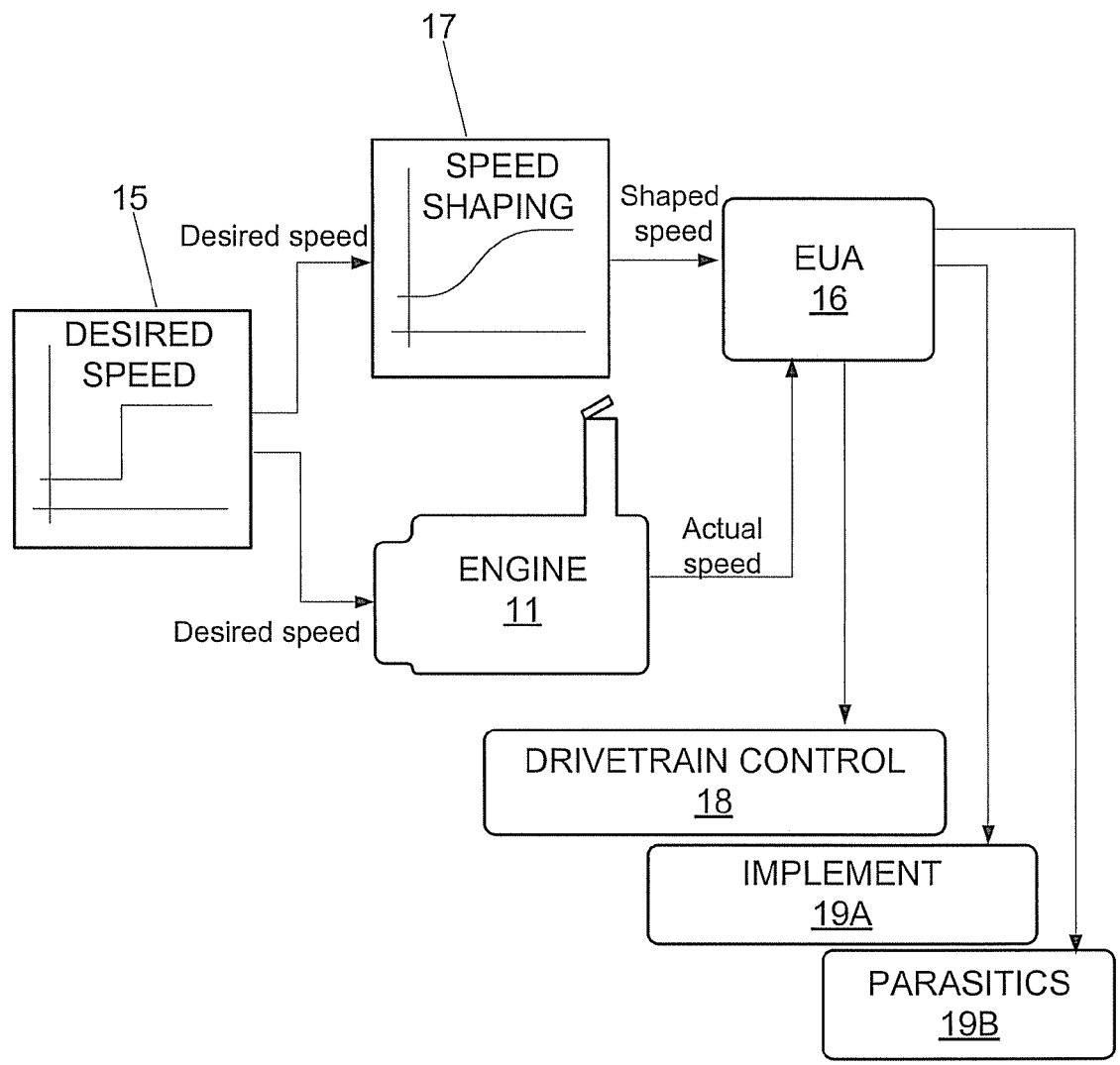
FIG. 3 is a system data flow schematic for a drivetrain system in accordance with the disclosed principles.

The data flow among system elements is illustrated schematically in FIG. 3. The user interface 15 transmits a desired speed signal 15 to the engine 11. The engine 11 responds by attempting to provide the requested speed, attaining an actual engine speed that is somewhat less than the desired speed. A signal indicative of the actual speed of the engine 11 is transmitted to the EUA 16, which may be a module (engine underspeed module) executed within the controller 14. The actual speed is also provided to various transmission control functions that will not be discussed in depth at this point.

Also within the controller 14, a speed shaping algorithm 17 receives the signal indicative of the desired speed of the engine 11. The speed shaping algorithm 17 modifies the desired speed so that it is no longer a step function, but is a gradual function reflecting the typical acceleration time of the engine 11. In this manner, the difference between the actual engine speed received at the EUA 16 from the engine 11 and the shaped desired speed received at the EUA 16 from the speed shaping algorithm 17 is reduced. The EUA 16 then provides control signals to the drivetrain control 18, as well as any implement 19a and other parasitic devices 19b. In this manner, optimum system performance is provided and the anti-lugging functionality will not unnecessarily reduce the transmission, implement, or parasitic power requests.

Figure 4:
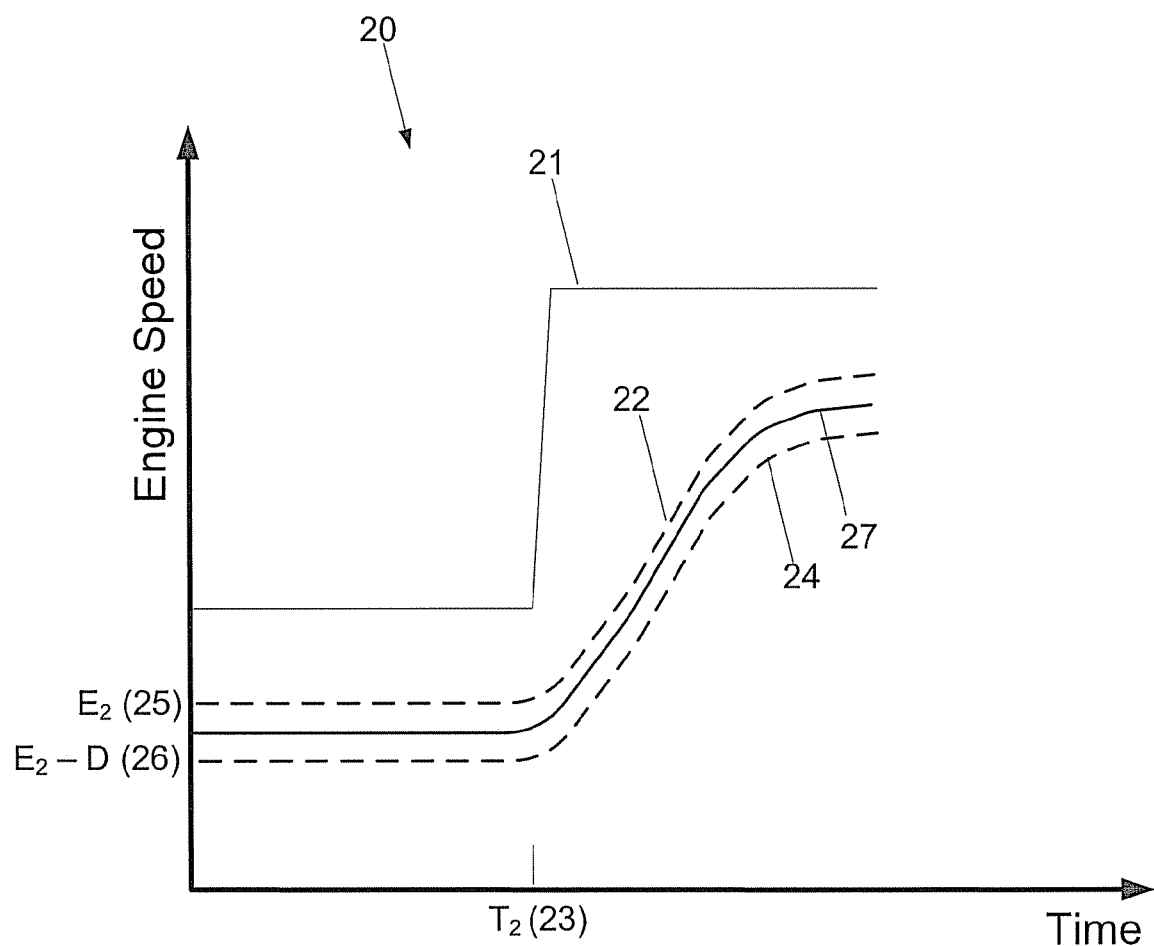
FIG. 4 is an engine speed graph showing a desired engine speed curve and an actual engine speed curve, and a shaped engine speed curve in accordance with the disclosed principles.

FIG. 4 is a second speed graph 20 showing a requested engine speed 21 (offset vertically for clarity) including a step increase at time $T_2$ (23). However, the plot 20 of FIG. 4 also includes a shaped desired speed 22 that is input to the EUA 14 only. Thus, the EUA lugging threshold 24, derived as a difference from the shaped desired engine speed 22, is less than the shaped desired engine speed 22 by the gap value D. The gap value D may change as a function of transmission, implement, parasitic and engine parameters, or operating conditions. In the illustrated example, if the shaped desired engine speed 22 starts at a value $E_2$ (25) then the EUA lugging threshold 24 starts at a value $E_2$–D (26). The speed graph 1 also shows the actual engine speed 27. In this case, since the shaped desired speed 22 more closely approximates attainable engine performance, the actual engine speed 27 is within the gap D of the shaped desired engine speed 22, avoiding the unnecessary invocation of anti-lugging steps by the EUA 14.

Figure 5:
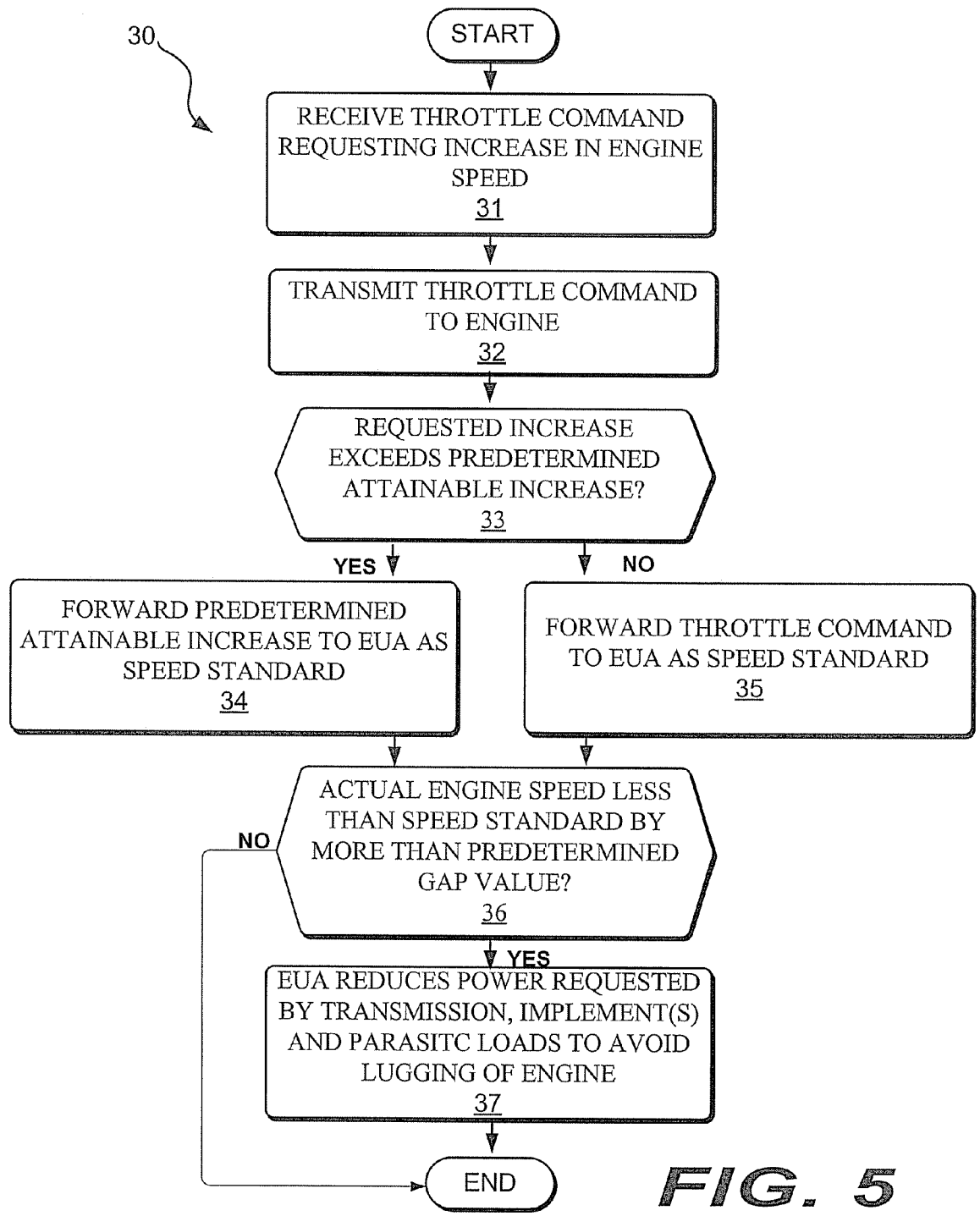
FIG. 5 is a flow chart showing a process of drivetrain management in accordance with the disclosed principles.

FIG. 5 is a flow chart illustrating a process 30 for engine and drivetrain control using speed shaping. Although the process 30 is usable with the system components and arrangements described above, it will be appreciated that the process 30 is also more widely applicable and is not limited to the specific system arrangement shown. Moreover, it will be assumed that the process 30 is executed by a system controller, e.g., controller 14, but it will be appreciated that the described steps may be implements by any suitable computing device or processor.

At stage 31, the controller 14 receives a throttle command requesting an increase in engine speed. At stage 32, the throttle command is transmitted to the engine 11. The controller 14 determines at stage 33 whether the requested increase exceeds a predetermined attainable increase, e.g., represented in FIG. 4 by shaped desired speed 22. If the requested increase exceeds the predetermined attainable increase, the controller 14 forwards the predetermined attainable increase to the EUA 16 as a speed standard in stage 34 for anti-lugging processing. If instead the requested increase does not exceed the predetermined attainable increase, the controller 14 forwards the throttle command to the EUA 16 as a speed standard in stage 35 for anti-lugging processing.

At stage 36, the EUA 16 determines whether the actual engine speed attained by the engine 11 is less than the speed standard by more than a predetermined gap value. The gap value may be set in each implementation according to designer preferences. In an embodiment, the gap value is set at or about 200 RPM. If the actual engine speed is less than the speed standard by more than the predetermined gap value, then at stage 37 the EUA 16 reduces the power request to the transmission, implement, or other parasitic devices seen by the engine 11 to avoid lugging of the engine 11. Otherwise, the process 30 terminates without the need to engage in anti-lugging functions.

As noted above, the controller 14 also implements power and torque derating functions in an embodiment. These functions serve to proactively avoid lugging and subsequent intervention by the EUA 16. Both functions are implemented at low speeds, e.g., in the lower quarter of the engine speed range. At lower speeds, the engine 11 is unable to produce peak power. Thus, the peak drivetrain power is derated according to the known engine characteristics, i.e., engine power as a function of engine speed. As a result, when the engine speed falls within a predetermined lower range, e.g., the lower quarter of the engine speed range, the controller 14 limits the peak drivetrain power that may be requested. In this way, the engine 11 is not subjected to power requirements that would force an underspeed condition.

In cooperation with the foregoing techniques for avoiding lugging while avoiding unnecessary invocation of anti-lugging functionality, other specific techniques for desired engine speed shaping may also be implemented. Each of the following speed shaping techniques is triggered upon the detection of a step increase in the commanded engine speed. For example, if a substantial increase in commanded engine speed, e.g., about 20-2000 RPM or other suitable value, is detected from one loop of the controller 14 to the next loop, e.g., within about 10 ms, a step increase is detected. Moreover, the speed shaping mode is exited when either (a) the actual engine speed is within a certain range R of the commanded engine speed, or (b) a predetermined limit period, e.g., 4 seconds, expires without the mode being exited otherwise.

Figure 6:
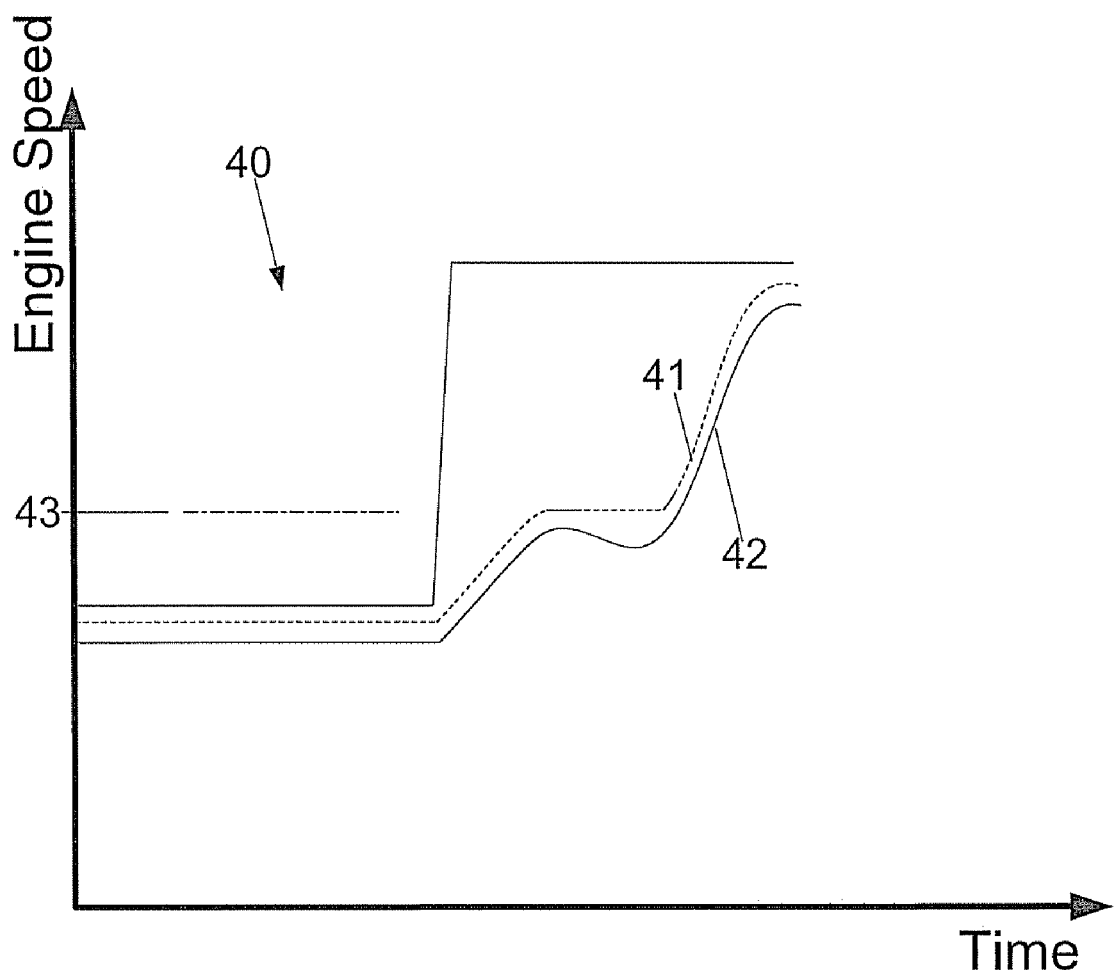
FIG. 6 is a speed plot showing a desired engine speed shaping technique in accordance with the disclosed principles.

In an embodiment, the shaped desired engine speed 41 is allowed to follow the actual engine speed 42 while the actual engine speed 42 is increasing as shown in speed plot 40 of FIG. 6. However, if the actual engine speed 42 decreases during this time, the shaped desired engine speed 41 is maintained at the last value 43 prior to the decrease. In this way, if the engine 11 lugs after the step increase command, the controller 14 is able to detect this.

Figure 7:
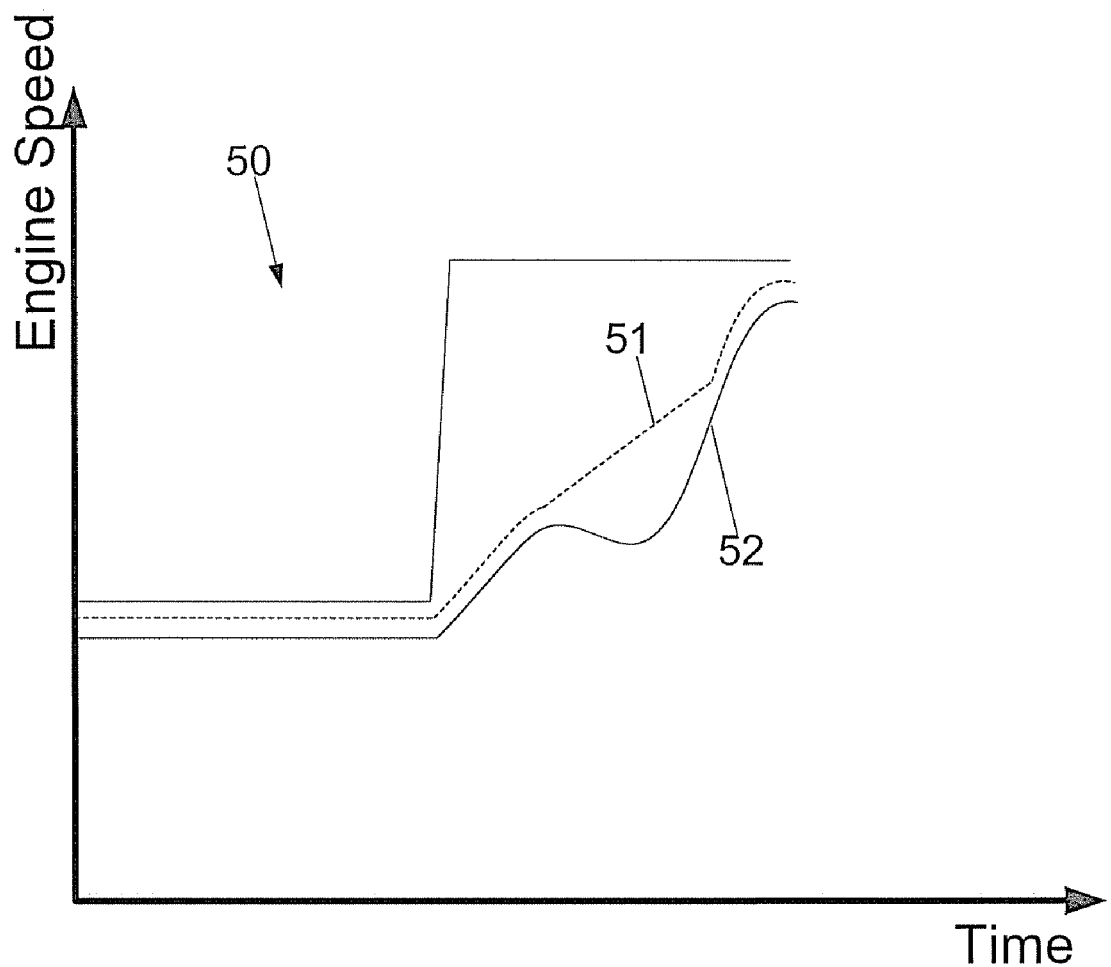
FIG. 7 is a speed plot showing a further desired engine speed shaping technique in accordance with the disclosed principles.

In another embodiment, as illustrated in speed plot 50 of FIG. 7, instead of holding the shaped desired engine speed 51 fixed at the value before the actual engine speed 52 drops, the shaped desired engine speed 51 continues to increase at a fixed rate. The rate at which the shaped desired engine speed 51 continues to increase is a function of the implementation details, however a rate of 125 RPM/sec is used in one embodiment.

Figure 8:
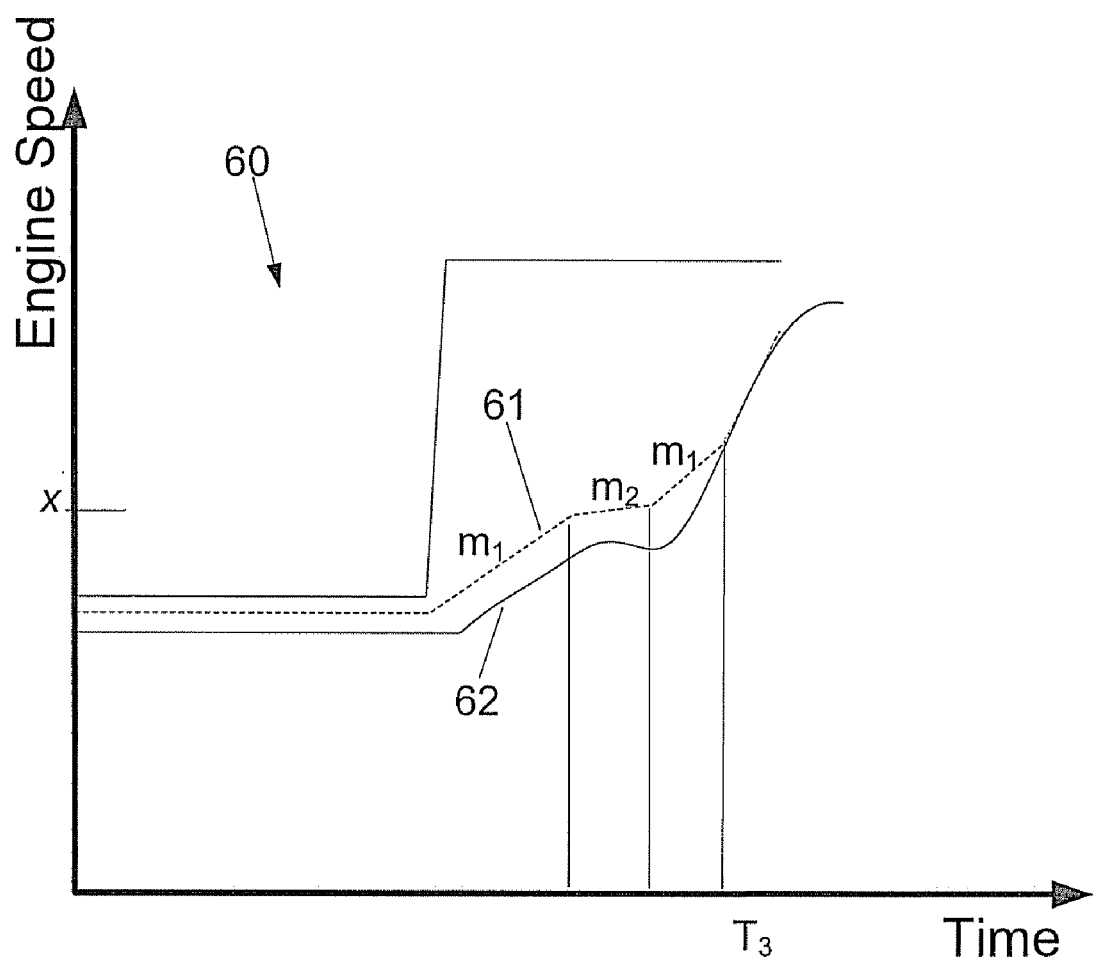
FIG. 8 is a speed plot showing yet a further desired engine speed shaping technique in accordance with the disclosed principles.

In yet another embodiment, illustrated in speed plot 60 of FIG. 8, the shaped desired engine speed 61 is defined by an engine speed knee value x, e.g., 1500 RPM, and two speed slopes $m_1$ and $m_2$. This technique allows the flexibility of a higher target slope initially and, once the shaped desired engine speed crosses x, a shallower slope. In this embodiment, similar to those discussed above, the actual engine speed 62 is not permitted to rise above the shaped desired engine speed 61. Thus, once the actual engine speed 62 reaches the shaped desired engine speed 61 at time $T_3$, the shaped desired engine speed 61 returns to slope $m_1$ or a greater slope as it follows actual engine speed (62).

INDUSTRIAL APPLICABILITY

The present disclosure is applicable to machines having CVT-driven transmissions or other direct-drive transmissions where engine lugging is possible. In these types of transmissions, there are generally controls in place to ensure that the engine does not lug down under load. These controls generally analyze requested throttle increases to determine whether the engine fails to follow the requested increase. If the engine fails to follow the requested increase, an engine underspeed algorithm may decrease the overall requested system power, helping engine speed response. The disclosed principles allow the system to break this link and allow optimum part throttle performance by shaping the throttle command before giving it to the EUA for anti-lug processing.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A machine having underspeed control, the machine comprising:
   an engine;
   a drivetrain;
   an implement;
   a parasitic load; and
   a controller for controlling the drivetrain, implement, and parasitic load, the controller further comprising:
      an interface for receiving a commanded engine speed and for passing the requested engine speed to the engine;
      a speed shaping module for receiving the commanded engine speed from the interface and for generating a target engine speed that is modified from the commanded engine speed; and
      an engine underspeed algorithm module for receiving the target engine speed from the speed shaping module, and for receiving a signal indicative of an actual engine speed, and for determining, based on the target engine speed and the actual engine speed, whether engine is lugging.

2. The machine according to claim 1, wherein, after a step increase in the commanded engine speed, the target engine speed is less than the commanded engine speed and equal to or greater than the actual engine speed.

3. A controller for controlling a machine having an engine and a drivetrain, to avoid engine lugging while optimizing engine performance when the engine is not lugging, the system comprising:
   an interface for receiving a commanded engine speed and for passing the requested engine speed to the engine;
   a speed shaping module for receiving the commanded engine speed from the interface and for generating a target engine speed that differs from the commanded engine speed; and
   an engine underspeed algorithm module for receiving the target engine speed from the speed shaping module, and for receiving a signal indicative of an actual engine speed, and for determining based on the target engine speed and the actual engine speed whether engine is lugging.

4. The controller according to claim 3, wherein the target engine speed is at least partly the same as the actual engine speed.

5. The controller according to claim 4, wherein the target engine speed differs from the actual engine speed by a linearly increasing function substituted for a portion of the actual engine speed that includes a region of decreasing engine speed.

6. The controller according to claim 3, wherein the target engine speed differs from the actual engine speed by omitting any regions of decreasing engine speed.

7. The controller according to claim 6, wherein the target engine speed substitutes a flat function for any regions of decreasing engine speed.

8. The controller according to claim 3, wherein the target engine speed is a piecewise linear function.

9. The controller according to claim 3, wherein the target engine speed is the commanded engine speed if the actual engine speed approaches within a predetermined range of the speed command, or a predetermined limit period expires.

10. A method of optimizing machine performance using speed shaping in a machine having an engine and a drivetrain and implementing an engine underspeed technique, the method comprising:
    receiving a speed command requesting an increase in engine speed;
    transmitting the speed command to the engine;
    determining whether the requested increase is a step function increase; and
    detecting an actual engine speed, and if the requested increase is a step function increase, entering a desired speed shaping mode whereby a function other than the speed command is transmitted to the engine underspeed module as a speed standard for comparison to the actual engine speed, and if the requested increase is not a step function increase, forwarding the throttle command to the engine underspeed module for comparison to the actual engine speed;
    determining in the engine underspeed module whether the actual engine speed is less than the speed standard by more than a predetermined gap value; and
    if the actual engine speed is less than the speed standard by more than the predetermined gap value, reducing a power requested by a portion of the machine to avoid lugging of the engine.

11. The method according to claim 10, wherein the portion of the machine includes one or more of the drivetrain, a machine implement, and a parasitic system.

12. The method according to claim 10, wherein determining whether the requested increase is a step function increase comprises determining whether the speed command differs from a prior speed command given within a predetermined period by more than a threshold amount.

13. The method according to claim 10, wherein the predetermined period corresponds to an integral number of loops of a controller.

14. The method according to claim 10, wherein the function other than the speed command is at least partly the same as the actual engine speed.

15. The method according to claim 14, wherein the function other than the speed command differs from the actual engine speed by omitting any regions of decreasing engine speed.

16. The method according to claim 15, wherein the function other than the speed command substitutes a flat function for any regions of decreasing engine speed.

17. The method according to claim 14, wherein the function other than the speed command differs from the actual engine speed by substituting a linearly increasing function for a portion of the actual engine speed that includes a region of decreasing engine speed.

18. The method according to claim 10, wherein the function other than the speed command is a piecewise linear function.

19. The method according to claim 10, wherein the function other than the speed command is bounded by a lower limit such that it cannot be less than the actual engine speed.

20. The method according to claim 10, wherein the desired speed shaping mode is exited upon the earlier of (1) the actual engine speed approaching within a predetermined range of the speed command, and (2) expiration of a predetermined limit period.

* * * * *